Feb. 24, 1925.

J. H. DORAN 1,527,635

ELASTIC FLUID TURBINE

Filed Jan. 23, 1924

Inventor:
John H. Doran
by *Alexander F. Lunt*
His Attorney

Patented Feb. 24, 1925.

1,527,635

UNITED STATES PATENT OFFICE.

JOHN H. DORAN, OF SCHENECTADY, NEW YORK, ASSIGNOR TO GENERAL ELECTRIC COMPANY, A CORPORATION OF NEW YORK.

ELASTIC-FLUID TURBINE.

Application filed January 23, 1924. Serial No. 688,069.

*To all whom it may concern:*

Be it known that I, JOHN H. DORAN, a citizen of the United States, residing at Schenectady, in the county of Schenectady, State of New York, have invented certain Improvements in Elastic-Fluid Turbines, of which the following is a specification.

The present invention relates to elastic fluid turbines and particularly to turbines intended to be operated by elastic fluid of a temperature and pressure substantially higher than those in common use today. In constructing turbines for higher pressures, the walls of the casing must necessarily be made thicker and heavier and these thicker and heavier walls coupled with the higher temperatures greatly magnify the problems of taking care of the expansion and contraction of the parts due to changes in temperature in such manner as to keep the casing and shaft concentric so as not to adversely affect the clearances of the packings and other parts, and at the same time prevent unduly large stresses being set up in the casing.

The object of my invention is to provide an improved arrangement for fastening or attaching the admission end of a turbine casing to a fixed support whereby while being held rigidly concentric with the shaft it will be free to expand and contract in all directions, and for a consideration of what I believe to be novel and my invention, attention is directed to the accompanying description and the claims appended thereto.

Figure 1:
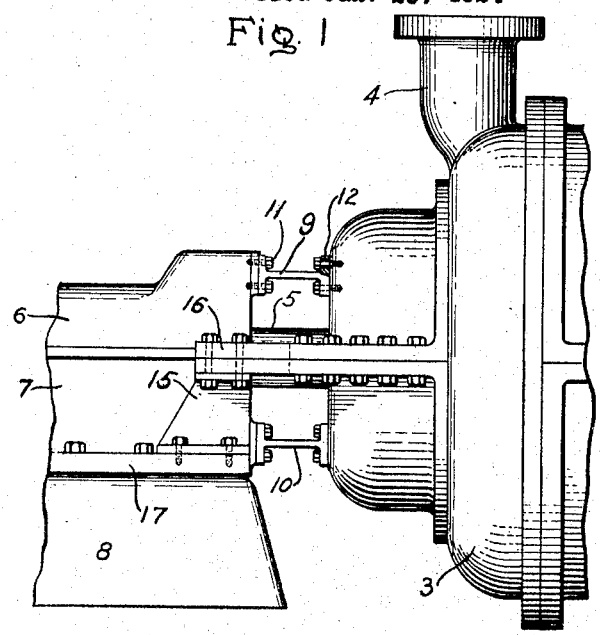
Figure 2:
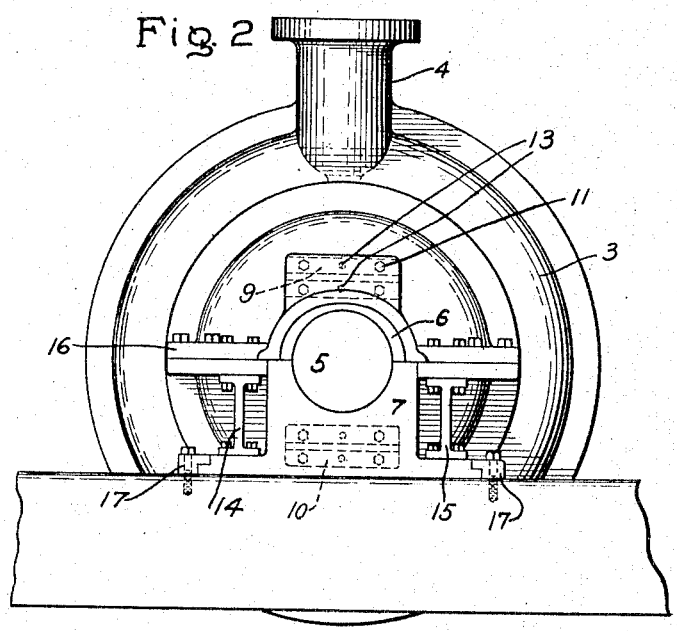

In the drawing, Fig. 1 is a side elevation of an arrangement embodying my invention, and Fig. 2 is an end view thereof.

Referring to the drawing, 3 indicates the casing of an elastic fluid turbine, the high pressure end only being shown in the drawing; 4 indicates the elastic fluid admission conduit, and 5 indicates the shaft which at the one end is journaled in a bearing 6 supported by a bearing pedestal 7. Bearing pedestal 7 is mounted on a base 8. This construction so far described may be taken as typical of any suitable turbine structure.

Now, according to my invention, I attach the high pressure end of the turbine casing to a fixed support, in the present instance the bearing pedestal 7, by means of two sets of connecting members, one set being rigid in a transverse direction and yieldable or flexible in a vertical direction and the other set being yieldable or flexible in a transverse direction and rigid in a vertical direction. Preferably each set comprises two members placed diametrically opposite to each other.

In the particular embodiment of my invention illustrated in the drawing, the one set of connecting members comprises two members 9 and 10 of I-beam section, one located above shaft 5 and the other below shaft 5. The flanges of the I-beams are bolted to the head of the turbine casing and to the bearing pedestal by bolts 11, the webs being horizontal. Preferably the openings for bolts 11 are oversize as indicated at 12, the I-beams being centered by dowels 13 arranged in the vertical plane of the axis of the shaft. This set of connections holds the casing rigidly against movement as a unit in a transverse direction but permits of expansion and contraction radially in any direction.

The other set of connecting members comprises two members 14 and 15 of I-beam section one located at each side of shaft 5 and connected at one end to the casing at the horizontal plane of the axis of the shaft and at the other end to the bearing pedestal. The web of the I-beam extends vertically and its upper flange is bolted directly to forward extensions 16 of the casing flange. Preferably both the upper and lower casing flanges are extended forward so as to provide a strong connection and one which is symmetrical. This set of connections holds the casing rigidly against movement as a unit in a vertical direction but permits of expansion and contraction radially in any direction.

The bearing pedestal is clamped to base 8 by L-shaped clamps 17 which serve to hold the pedestal from sidewise or twisting movement but permit it to move axially. When the turbine casing expands axially the bearing pedestal is free to move with it, the arrangement thus permitting free axial expansion of the casing.

From the foregoing description, it will be seen that by my invention I provide a construction wherein the turbine casing is held rigidly from movement as a unit so as to maintain the clearances but at the same time it is permitted to expand radially in all directions without setting up excessive stresses in the casing. Furthermore, the construction is simple, can be made readily as strong as required and can be manufactured at a low cost.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. In combination, a turbine casing, a support, and two sets of connecting members which attach the casing to the support, one set of connecting means being rigid in a transverse direction and yieldable in a vertical direction and the other set being rigid in a vertical direction and yieldable in a transverse direction.

2. In combination, a turbine casing, a support, means rigid in a transverse direction and yieldable in a vertical direction connecting the casing on its vertical axis to the support, and means rigid in a vertical direction and yieldable in a transverse direction connecting the casing on its horizontal axis to the support.

3. In combination, a turbine casing, a shaft, a support for the shaft, and two sets of I-beams connecting the casing to the support, one set being attached to the casing in the vertical plane of the shaft with its webs horizontal and the other set being attached to the casing in the horizontal plane of the shaft with its webs vertical.

In witness whereof, I have hereunto set my hand this 22nd day of January, 1924.

JOHN H. DORAN.